United States Patent Office 3,114,409
Patented Dec. 17, 1963

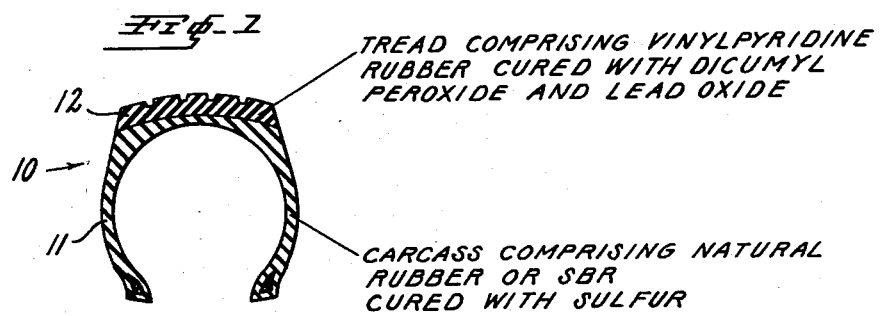
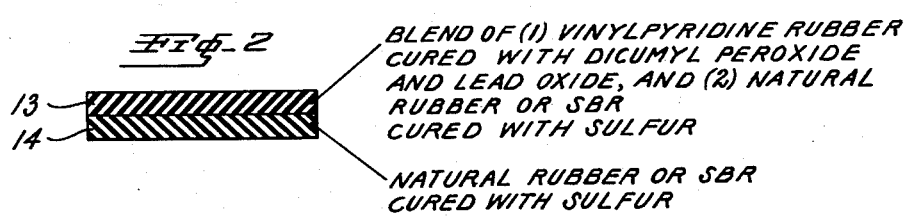
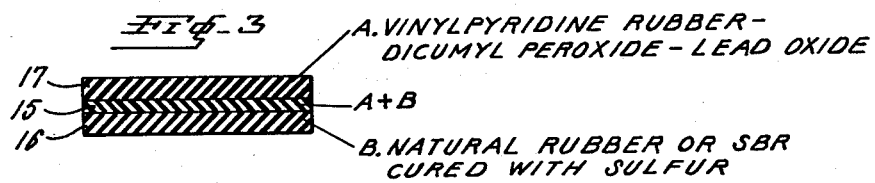
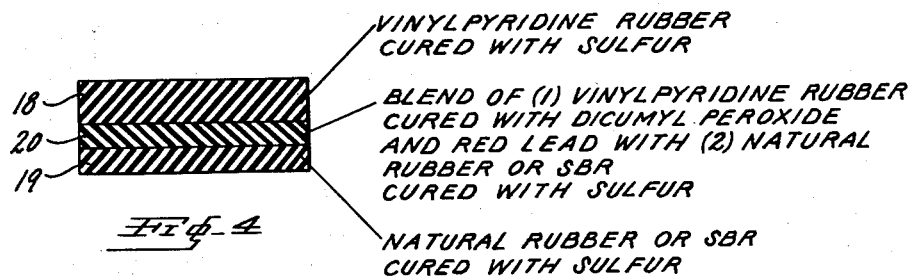

3,114,409
ADHESION OF VINYLPYRIDINE COPOLYMER RUBBER TO OTHER RUBBERS
Alfred N. Iknayan, Indianapolis, Ind., Harvey J. Batts, Birmingham, Mich., and James B. Borland, Indianapolis, Ind., assignors to United States Rubber Company, New York, N.Y., a corporation of New Jersey
Filed June 15, 1960, Ser. No. 31,530
8 Claims. (Cl. 152—330)

This invention relates to a method of improving the adhesion of vinylpyridine copolymer rubber to other rubbers, and more particularly to the adhesion of copolymers of monovinylpyridines with a major proportion of a diolefin to another rubber, as well as to the improved laminate thus obtained.

Ordinarily, if it is attempted to prepare a composite article comprising a layer of vinylpyridine copolymer rubber stock vulcanized to an adjacent layer of another rubber, such as Hevea or SBR compounded conventionally for sulfur vulcanization, it is found that the adhesion of the vinylpyridine rubber to the other rubber is poor. The principal object of the present invention is to improve the adhesion of the two different rubbers to each other. A further object of the invention in its preferred aspect is to bond the vinylpyridine copolymer rubber to the other rubber in such manner that the adhesion bond resists deterioration with age. Still another object is to provide an improved pneumatic tire, having a tread comprised of vinyl pyridine copolymer rubber and a carcass comprised of other rubber. Another object is to provide a method of retreading old tires with a vinylpyridine copolymer rubber tread.

In accordance with the invention, it has been found that if the vinylpyridine copolymer rubber is compounded with dicumyl peroxide as the curative and with a lead oxide, this stock can be vulcanized directly to a conventionally sulfur compounded other rubber stock, and will adhere firmly thereto with a tenacious bond. The "other rubber" with which the vinylpyridine copolymer adhesion stock of the invention is used may be defined as a rubbery polymer of a conjugated diolefin, such as isoprene or butadiene, and is typified by natural (Hevea) rubber, SBR (styrene-butadiene rubber), polyisoprene, and polybutadiene, especially the highly rubbery cis forms of the latter two polymers. The sulfur-compounded other rubber stock may be previously vulcanized or not. The vinylpyridine copolymer compounded with dicumyl peroxide and lead oxide may be used as a tie gum between two stocks. The thus compounded vinylpyridine rubber may be blended with sulfur-compounded other rubber, and this blend may be vulcanized to another body of sulfur-cured other rubber, or the blend may be used as a tie gum between two stocks. The adhesive bond thus obtained is remarkable for its resistance to deterioration upon aging.

The invention will be described with reference to the accompanying drawing, wherein:

FIG. 1 represents in diagrammatic fashion a cross-section of a pneumatic tire of the invention;

FIG. 2 is a fragmentary cross-sectional view of a preferred two-part laminate made in accordance with a modification of the invention;

FIG. 3 is similar to FIG. 2, but shows a modified three-component laminate; and

FIG. 4 is similar, but shows another modification.

The vinyl pyridine copolymer rubbers employed in the invention are copolymers of any of the monovinylpyridines, such as 2-vinylpyridine; 3-vinylpyridine; 4-vinylpyridine; 2-vinyl-5-ethylpyridine; 2-methyl-5-vinylpyridine; 2-methyl-6-vinylpyridine; and 2,4-dimethyl-6-vinylpyridine. Strongly preferred are the copolymers of the monovinylpyridines in which the vinyl group is in the meta position (i.e., in the 3- or 5-position), since these have outstandingly better resistance to abrasive wear than the other vinylpyridine copolymers. The vinylpyridine is copolymerized by conventional methods (usually emulsion polymerization) with a diolefin, preferably a butadiene, such as butadiene-1,3, or 2-methylbutadiene-1,3 (isoprene), or 2,3-dimethylbutadiene-1,3. The copolymer usually contains from 10 to 30% of the vinylpyridine, and correspondingly from 90 to 70% of the butadiene or the like. The vinylpyridine may be partially replaced with styrene or its known equivalents, such as alphamethyl styrene, chlorostyrenes etc. In such a terpolymer the vinylpyridine may amount to 5–25%, while the styrene may amount to 5–25%, but in any case the butadiene constitutes 70–90%. Preferred terpolymers contain at least 10% of vinylpyridine, e.g., 12.5% vinylpyridine, 12.5% styrene, and 75% butadiene.

For purposes of the invention 100 parts by weight of the described vinylpyridine copolymer rubber is compounded with dicumyl peroxide in amount sufficient to produce substantial vulcanization or cure, usually from 0.25 to 8 parts, preferably 0.8 to 4 parts. It is also essential to include in the composition a small amount of a lead oxide, usually red lead ($Pb_3O_4$) or litharge (PbO), usually in amount of from about 1 to about 10 parts, preferably about 5 to 7 parts, per 100 parts of vinylpyridine copolymer rubber. The composition may be prepared in the usual internal mixer and/or open mill in accordance with conventional practice. Other suitable conventional compounding ingredients may also be present, such as processing aids, plasticizers, antioxidants, softeners, and fillers or pigments such as carbon black, silica, etc. The composition is vulcanizable by heat under conventional conditions.

The other rubber body, to which the vinylpyridine rubber is to be adhered, is, as indicated, a polymer of a diolefin, whether natural (Hevea) rubber or an SBR (styrene-butadiene copolymer) type of synthetic rubber, or synthetic rubbery cis polyisoprene or cis polybutadiene. This other rubber is compounded for sulfur vulcanization in accordance with conventional practice, using elemental sulfur and/or sulfur-donating materials such as tetramethyl thiuram disulfide, typically along with any of the usual accelerators of sulfur vulcanization, such as the ultra-accelerators. The proportions of such vulcanizing ingredients simply follow conventional practice. The composition may further include the usual supplementary compounding ingredients, such as processing aids, plasticizers, softeners, mold release agents, antioxidants, fillers or pigments (e.g., carbon black, silica), etc. In one of its simplest forms, the invention contemplates preparing the compounded vinylpyridine rubber stock and the other rubber stock and shaping such stocks separately into desired preforms by calendering, extrusion, or other appropriate conventional shaping operation. Either or both of the bodies of rubber stock may be associated with suitable reinforcement, such as textile fabric or wire. The two preformed bodies of rubber stock are then placed in contact with each other and vulcanized by heat, preferably under pressure and usually while confined in a mold having the shape of the finally desired article. The time and temperature required to effect the cure are conventional, and will depend on such variables as the amount of curative present, the size of the article, the character of the heating device, etc. (the time and temperature being of course inversely related). It is found, most surprisingly, that the vinylpyridine rubber stock thus becomes firmly adhered to the other rubber. The adhesive bond has remarkable strength, that is quite in contrast to the discouragingly poor adhesion of vinylpyridine rubber to other rubbers when conventional practice is followed. This new result is the more surprising when it is considered that the improved adhesion is not obtained if (1) the vinylpyridine rubber is compounded for sulfur vulcanization in place of vulcanization with dicumyl peroxide, or (2) the vinylpyridine rubber is compounded with other metal oxides in place of lead oxide. These facts will be demonstrated in the working examples below.

Referring to the drawing, and particularly to FIG. 1, there is there represented a pneumatic tire 10, having a carcass 11 comprised of sulfur-vulcanized natural rubber or SBR stock, to which there has been cured directly a tread 12 comprised of vinylpyridine rubber stock cured with dicumyl peroxide and containing lead oxide. Such a tread is firmly adherent, in contrast to a conventionally formulated vinylpyridine rubber tread, which would generally adhere to an SBR carcass only very poorly.

In a preferred practice of the invention, as illustrated in FIG. 2, the vinylpyridine rubber stock compounded for cure with dicumyl peroxide and containing lead oxide is mixed with a substantial quantity of another rubber (natural or SBR) compounded for sulfur vulcanization as previously described. For the present purposes, such a mixture typically contains from 5 to 95% of the dicumyl peroxide-curing vinylpyridine rubber stock and correspondingly from 95 to 5% of the sulfur-curing other rubber stock. This mixture constitutes one layer 13 of the laminate, while the other layer 14 of the laminate is made of the other rubber stock, again compounded for sulfur vulcanization. Upon curing, the laminate exhibits a most remarkably strong state of adhesion between the layer 13 containing the vinylpyridine rubber and the other layer 14. An outstanding advantage of laminates produced in this fashion is that the adhesive bond substantially retains its high level of strength throughout prolonged periods of service or aging.

One particularly advantageous way of utilizing the preferred adhesion system just described is illustrated in FIG. 3, wherein an intermediate layer or tie ply 15 is formulated of the described mixture of dicumyl peroxide-curing vinylpyridine rubber (with lead oxide) and sulfur-curing other rubber. This tie ply 15 is applied to the surface of a body 16 of sulfur-curing other rubber. Superimposed on the other side of the tie ply 15 is another body 17 of dicumyl peroxide-curing vinylpyridine rubber composition. Upon vulcanization, this assembly exhibits the remarkably permanent high level of adhesion characteristic of the preferred form of the invention. Similar results are obtained if a sulfur-curing vinylpyridine copolymer rubber stock is substituted as the layer 17. This is illustrated in FIG. 4, wherein a layer 18 of sulfur-curing vinylpyridine rubber (this might represent, for example, a tire tread) is adhered to a base 19 of sulfur-curing natural or SBR rubber (representing for example a tire carcass) through the medium of an adhesive layer 20 made up of a mixture of vinylpyridine rubber cured with dicumyl peroxide and red lead, blended with natural or SBR rubber cured with sulfur.

One of the most remarkable advantages of the invention resides in the excellent mechanical and physical qualities, such as tensile strength, resistance to cracking and resistance to abrasive wear, of the vulcanized vinylpyridine rubber adhesion stock of the invention. Similarly the blend of the described vinylpyridine rubber stock with sulfur-curing other rubber stock gives a vulcanizate which has good physical properties and resists cracking and abrasive wear. This is particularly fortunate because it would be of little use to improve the adhesion of the vinylpyridine rubber if good wearing qualities were not obtainable at the same time.

The examples which follow, wherein all parts and percentages are expressed by weight, will serve not only to illustrate the practice of the invention in more detail, but some of the examples will demonstrate the relative inoperativeness of departing from the essentials of the invention. In all examples (except where otherwise specified) the vinylpyridine rubber employed is a conventionally emulsion prepared copolymer of 25% of 2-methyl-5-vinylpyridine with 75% of butadiene. The SBR employed is a commercial copolymer known as "SBR–6605" which contains 23% styrene and 77% butadiene. The natural rubber employed, Hevea, is in the form known as "No. 2 smoked sheet." The chemical identity, function and source of materials specified by industrial name or trademark in the examples are as follows: "HAF black" is carbon black of the grade known as high abrasion furnace. "FEF black" is the fast extrusion furnace grade of carbon black. "MPC black" is the medium processing channel grade. "Hi-Sil 233" is silica, a reinforcing filler (Pittsburgh Plate Glass). "DiCup 40C" is a commercial dicumyl peroxide preparation, containing 40% dicumyl peroxide in precipitated calcium silicate as a carrier, obtained from Hercules Powder Co. Red lead is $Pb_3O_4$, a combination of $Pb_2O_3$ and PbO. Litharge is PbO. "BLE #25," an antioxidant, is an acetone-diphenylamine condensation product, obtained from the Naugatuck Chemical Division of the United States Rubber Company. "Bayer 4010," an antioxidant, is N,N'-di-2-naphthyl-p-phenylenediamine, obtained from Bayer Co. "JZF" is an antioxidant, N,N'-diphenyl-p-phenylenediamine obtained from Naugatuck Chemical. "SNS" is an accelerator, N-tertiary-butyl-2-benzothiazolesulfenamide, from Monsanto. "Santocure NS" is a Monsanto accelerator, the same as "SNS." "DIBS" is diisopropyl benzothiazole-2-sulfenamide supplied by American Cyanamid Co. "Peptizer No. 1" is a solution of 36.5% xylyl mercaptan in 63.5% of an inert hydrocarbon solvent, supplied by du Pont. "#8 oil" and "Necton 60" are rubber processing petroleum hydrocarbon oils supplied by Standard Oil Co. while "Sundex 53" is a rubber processing petroleum hydrocarbon oil supplied by Sun Oil Co. "NOBS #1," a mixed accelerator, N-oxydiethylene-2-sulfenamide and benzothiazyldisulfide, is supplied by American Cyanamid Co. "Crystex" is sulfur supplied by Stauffer Chemical Co. "Antioxidant 425" is 2,2'-methylene bis (4-ethyl-6-tertiary butyl phenol) from American Cyanamid. "UOP288" is N,N'-di-2-octyl-p-phenylene diamine (Universal Oil Products). "Suprex" is a clay supplied by Huber Corp. "Superla Wax" is supplied by Standard Oil Co. Unless otherwise indicated, the various compounding ingreditents are optional. They can be replaced by suitable known commercially available equivalents.

The adhesion test results referred to in the examples are obtained in the following manner. An adhesion test pad or laminate is assembled from the vinylpyridine rubber stock to be tested for adhesion to the other rubber by plying milled strips of the two stocks together, with a piece of fabric on the outside surface of each strip. The test pad thus assembled is then vulcanized under pressure in a mold for 20 minutes at 320° F. The cured pad is removed from the mold and the adhesion test is performed by pulling the strips apart. The width of the strips is one inch, and the force, in pounds, necessary to pull the strips apart at a rate of two inches per minute is reported as the adhesion. In some cases, the adhesive bond is so strong that the sample does not fail at the interface between the two stocks, but instead the rubber is pulled away from the fabric. The temperature of the test is specified because this is highly significant, since in many cases it is possible to have good adhesion at room temperature, but the adhesive bond may become weaker as the temperature of the test is increased.

*Example I*

The following vinylpyridine rubber stock was prepared:

| | Parts |
|---|---|
| Vinylpyridine rubber | 100.00 |
| HAF black | 40.00 |
| "BLE #25" | 1.00 |
| "Necton 60" | 5.00 |
| Wax | 5.00 |
| Red lead | 7.00 |
| "DiCup 40C" | 3.75 |

The following natural rubber stock was prepared:

| | |
|---|---|
| Natural rubber | 100.08 |
| FEF carbon black | 20.00 |
| Zinc oxide | 10.00 |
| Stearic acid | 2.03 |
| "SNS" | 0.34 |
| "Bayer 4010" | 0.50 |
| "JZF" | 0.20 |
| "UOP288" | 2.50 |
| "BLE #25" | 1.00 |
| Pine tar | 3.75 |
| Sulfur | 3.50 |

To test the adhesion of the stocks to each other, the vinylpyridine rubber stock was laminated to the natural rubber stock and the laminate was cured as described previously. The laminate was then subjected to the described adhesion test at a temperature of 250° F. The force required to tear off the one inch strip at a rate of two inches per minute was in excess of 38.0 pounds, and even this force did not break the adhesive bond at the interface between the two rubber stocks, but, instead, the rubber tore loose from the reinforcing fabric.

If the foregoing example is repeated, using a sulfur compounded SBR stock in place of the natural rubber stock, essentially equivalent results are obtained. Similar results are obtainable by substituting sulfur-curing blends of SBR rubber, natural rubber, and reclaimed rubber, in various combinations, for the sulfur-curing natural rubber stock shown above.

*Example II*

Example I was repeated, except that the red lead was omitted from the vinylpyridine rubber stock. When the adhesion of the laminated vulcanizates was tested in the manner described a pull of 48 pounds was required when the test was carried out at 75° F. However, when the test was carried out at 250° F., the adhesive bond was found to be unacceptable, having a strength of only 5 pounds. This shows that if the lead oxide is omitted from the adhesion system of the invention the resulting bond is thermoplastic, that is, it loses its strength at elevated temperatures. It will be appreciated that pneumatic tires and other rubber articles normally attain quite elevated temperatures in service, so that in order to be of any practical use the adhesive bond must retain its strength at elevated temperatures. The results of the adhesion tests at 250° F. are therefore particularly significant as demonstrating the unique ability of the adhesive bond of the invention (Example I) to maintain an acceptable level of strength even at high temperature, in contrast to the loss of bond strength at elevated temperature if the red lead is omitted.

*Example III*

Like Example II, the present example does not follow the practice of the invention, but serves to demonstrate the inoperativeness of compounding both the vinylpyridine rubber and the other rubber for sulfur cure. An adhesion test laminate was prepared as in Example I, using the described sulfur-curing natural rubber stock for one layer, and using the following sulfur-curing vinylpyridine rubber stock for the other layer:

| | |
|---|---|
| Vinylpyridine rubber | 100.00 |
| MPC carbon black | 40.00 |
| Zinc oxide | 3.00 |
| Stearic acid | 1.00 |
| Wax | 5.00 |
| "Sundex 53" | 5.00 |
| "SNS" | 0.35 |
| Sulfur | 1.75 |

When the vulcanized laminate of these two sulfur-curing stocks was tested for adhesion as described, it was found that the adhesion at 75° F. was a mere 5–10 pounds. At 250° F. the adhesion was nil. This demonstrates the difficulty of adhering vinylpyridine rubber to other rubbers, and emphasizes the magnitude of the problem which is solved by the present invention. Essentially the same results are obtained if either or both of the stocks contain lead oxide.

*Example IV*

This example demonstrates that the desired adhesion is not obtained if the vinylpyridine rubber is compounded for sulfur vulcanization while the other rubber is compounded for cure with dicumyl peroxide. This is essentially a reversal of the compounding system of the invention.

An adhesion test laminate was prepared, using the sulfur-curing vinylpyridine stock of Example III for one layer, and using the following dicumyl peroxide-curing natural rubber stock for the other layer:

| | |
|---|---|
| Natural rubber | 100.00 |
| HAF carbon black | 20.00 |
| "BLE #25" | 1.00 |
| "DiCup 40C" | 3.75 |

The adhesive bond of the vulcanized laminate had a strength of only 11 pounds at 75° F., and a mere 9.0 pounds at 250° F. Similarly, unsatisfactory results are obtained if either or both layers of the laminate contain red lead.

*Example V*

This example illustrates blended adhesive systems of the invention. The following batches were prepared:

| | Batch #2 | Batch #1 |
|---|---|---|
| Vinylpyridine rubber | 100.00 | |
| SBR6605 | | 220.00 |
| HAF carbon black | 40.00 | |
| "BLE #25" | 1.00 | |
| Red lead | 7.00 | |
| Zinc oxide | | 3.00 |
| Stearic acid | | 1.50 |
| "#8 oil" | | 0.75 |
| "Suprex" | | 0.25 |
| "DiCup 40C" | 3.75 | |
| "NOBS #1" | | 1.20 |
| Diphenyl guanidine | | 0.35 |
| "Crystex" | | 2.00 |
| | 151.75 | 229.05 |

A blend was then prepared by mixing 151.75 parts of Batch #2 with 229.05 parts of Batch #1. An adhesion test specimen was prepared by laminating this blend to the sulfur-curing natural rubber stock described in Example I. The test specimen was cured in a mold for 20 minutes at 320° F. When a 1″ strip was pulled off at a speed of 2″ per minute at 250° F., a pull of more than 30 pounds was required, at which point the blended stock actually tore the natural rubber stock from the cord, without even breaking the bond at the interface between the blended stock and the natural rubber.

A particularly advantageous characteristic of the blended adhesion system of the invention resides in the unusual resistance of the adhesive bond to deterioration upon aging.

*Example VI*

This example shows the results obtained with varying quantities of dicumyl peroxide curative, and two kinds of carbon black. The recipes of the vinylpyridine rubber stocks are shown in the following table, along with the adhesion test results obtained when the vinylpyridine stock is vulcanized to a sulfur-curing natural rubber stock compounded as described previously:

|  | 1 | 2 | 3 | 4 | 5 |
|---|---|---|---|---|---|
| Vinylpyridine rubber | 100.00 | 100.00 | 100.00 | 100.00 | 100.00 |
| HAF carbon black | 40.00 | 40.00 | 40.00 | ------ | 40.00 |
| MPC carbon black | ------ | ------ | ------ | 40.00 | ------ |
| "BLE #25" | 1.00 | 1.00 | 1.00 | 1.00 | 1.00 |
| Red lead | 7.00 | 7.00 | 7.00 | 7.00 | 7.00 |
| "DiCup 40C" | 3.75 | 3.12 | 2.50 | 3.75 | 4.38 |
| Parts dicumyl peroxide | 1.50 | 1.25 | 1.00 | 1.50 | 1.75 |
| Strength of adhesive bond to sulfur cured Hevea at 250° F., pounds | 36 | 38–40 | 36.0 | 25.0 | 38.0 |

*Example VII*

This example shows the relative ineffectiveness of various other metal oxides, in comparison to the lead oxides. The various stocks shown in the following table were vulcanized to a sulfur curing natural rubber stock, with the results shown:

|  | 1 | 2 | 3 | 4 | 5 | 6 | 7 | 8 | 9 |
|---|---|---|---|---|---|---|---|---|---|
| Vinylpyridine rubber | 100.00 | 100.00 | 100.00 | 100.00 | 100.00 | 100.00 | 100.00 | 100.00 | 100.00 |
| HAF black | 40.00 | 40.00 | 40.00 | 40.00 | 40.00 | 40.00 | 40.00 | 40.00 | 40.00 |
| BLE #25 | 1.00 | 1.00 | 1.00 | 1.00 | 1.00 | 1.00 | 1.00 | 1.00 | 1.00 |
| "DiCup 40C" | 3.75 | 3.75 | 3.75 | 3.75 | 3.75 | 3.75 | 3.75 | 3.75 | 3.75 |
| Stannic oxide | 7.00 | | | | | | | | |
| Calcium oxide | | 7.00 | | | | | | | |
| Zinc oxide | | | 7.00 | | | | | | |
| Red lead | | | | 7.00 | | | | | |
| Litharge | | | | | 7.00 | | | | |
| Titanium oxide | | | | | | 7.00 | | | |
| "Hi Sil 233" | | | | | | | 7.00 | | |
| Red iron oxide | | | | | | | | 7.00 | |
| Magnesium oxide | | | | | | | | | 7.00 |
| Strength of adhesive bond to sulfur cured Hevea at 250° F., pounds | 11.0 | 10.5 | 9.75 | 31.0 | 31.5 | 13.0 | 12.5 | 9.5 | 8.0 |

The lead oxides are outstanding in improving the adhesion, and there is a large gap between them and the other metal oxides. All the metal oxides in this example improve the adhesion slightly over no metal oxide (compare Example II). The other metal oxides may be used to supplement lead oxide, but they may not replace it entirely.

*Example VIII*

Varoius levels of red lead are shown in this example:

|  | 1 | 2 | 3 |
|---|---|---|---|
| Vinylpyridine rubber | 100.00 | 100.00 | 100.00 |
| HAF black | 40.00 | 40.00 | 40.00 |
| "Necton 60" | 5.00 | 5.00 | 5.00 |
| "BLE #25" | 1.00 | 1.00 | 1.00 |
| Triethanolamine | 2.00 | 2.00 | 2.00 |
| Red lead | 5.00 | 3.00 | 1.00 |
| Magnesium oxide | 10.00 | 10.00 | 10.00 |
| "DiCup 40C" | 3.75 | 3.75 | 3.75 |
| Wax | 5.00 | 5.00 | 5.00 |
| Adhesion to Hevea at 250° F., pounds | 25 | 20 | 15 |

*Example IX*

This example, which is outside of the scope of the invention, confirms that a blend of dicumyl peroxide-curing vinylpyridine rubber with dicumyl peroxide-curing natural rubber does not give good adhesion when vulcanized to sulfur-curing natural rubber.

|  | 1 | 2 | Blend |
|---|---|---|---|
| Vinylpyridine rubber | 100.00 | ------ | |
| Natural rubber | ------ | 100.00 | |
| HAF carbon black | 40.00 | 20.00 | |
| "BLE #25" | 1.00 | 1.00 | |
| Wax | 5.00 | ------ | |
| "Necton 60" | 5.00 | ------ | |
| "DiCup 40C" | 3.75 | 3.75 | |
|  | 154.75 | 124.75 | |
| Blend Batch #1 | | | 154.75 |
| Batch #2 | | | 124.75 |
| Adhesion to Hevea at 250° F., pounds | | | 12 |

The results are unsatisfactory even if red lead is present in some or all of the rubbers.

*Example X*

The invention can be used to good advantage to make colored tire treads, which adhere well to a carcass made of other rubber. Following is a non-black tread compound, which gives an adhesive bond strength of 33 pounds at 250° F. in the described adhesion test, when vulcanized to a sulfur curing natural rubber stock:

| Vinylpyridine rubber | 100.00 |
|---|---|
| "Hi Sil 233" | 43.00 |
| Red iron oxide | 5.00 |
| Red lead | 7.00 |
| "Sundex 53" | 5.00 |
| "DiCup 40C" | 3.75 |

*Example XI*

The following is an example of a tie gum blend that is particularly applicable for adhering new treads, made of vinylpyridine rubber, to an old carcass of sulfur cured rubber:

|  | 1 | 2 |
|---|---|---|
| Vinylpyridine rubber | 100.00 | ------ |
| Natural rubber | ------ | 100.00 |
| HAF black | 40.00 | ------ |
| FEF black | ------ | 30.00 |
| Zinc oxide | ------ | 5.00 |
| "BLE #25" | 1.00 | 1.00 |
| Triethanolamine | 2.00 | ------ |
| Stearic acid | ------ | 2.00 |
| Magnesium oxide | 10.00 | ------ |
| Red lead | 7.00 | ------ |
| Wax | 5.00 | ------ |
| "Necton 60" | 5.00 | ------ |
| "SNS" | ------ | .35 |
| Sulfur | ------ | 3.50 |
| "DiCup 40C" | 3.75 | ------ |
|  | 173.75 | 141.85 |

Blend 173.75 parts of Batch 1 with 141.85 parts of Batch 2 to yield the tie gum blend.

The tie gum is used as the intermediate layer 15 in an adhesion system of the kind illustrated in FIG. 3 of the drawing. The old tire carcass is of course first buffed and cemented. In the case of a new tire, the outer side of the ply adjacent to the tread (whether a textile fabric ply or a wire ply, and whether a carcass ply or a breaker ply) may consist of such a tie gum blend, calendered onto such side.

The technique used in the experimental investigations leading up to the present invention is of more than a little interest, and it is considered worthwhile to describe the experimental method, especially since it gives an insight into a possible theory of operation of the invention. It is thought that the difficulty in adhering vinylpyridine rubber to other rubbers is caused by a flow of chemicals from the other rubber into the vinylpyridine rubber. This diffusive flow or migration of chemicals apparently causes, in conventional practice, a severe overcure by adding excess curatives to the vinylpyridine rubber.

To test out this theory, a special system of analysis was employed. It consisted of sandwiching the test specimens as if one were building an adhesion pad, except that the laminae were dusted with mica, so that the contacting surfaces could not adhere strongly and these surfaces could therefore be separated and examined after subjecting the assembly to vulcanization. Before the assembly was placed in the vulcanizing mold, one half of the contacting area was covered by a piece of aluminum foil so that the stocks could not affect each other in this half, and the other half of the area had the specimens in direct contact (except for the talc) with one another during cure, so that migratory chemicals could pass from one stock to the other over this half of the area. After the assembly was vulcanized, the pad was delaminated and the physical properties of the area protected and isolated by the aluminum foil were compared with those of the area exposed and free to permit migration of chemicals across the interface. A concise and exact analysis was thus made possible.

Using this technique, it became apparent that the sulfur-curing vinylpyridine rubber side of the interface was being severely degraded, actually vastly over-reacted when cured adjacent to sulfur curing Hevea. By a process of elimination it was established that the offending chemical was not carbon black, zinc oxide, stearic acid, antioxidant, or antiozonant. This left the accelerator, sulfur, and plasticizer for closer examination. It was soon determined that neither the accelerator nor the plasticizer were causing the trouble, and the offending chemical was sulfur. The vinylpyridine rubber surface directly exposed to the sulfur curing Hevea was so overcured that upon slight extension, e.g., 200–300%, the surface cracked deeply, not unlike dried mud. This condition was so striking that it could be observed whether the vinylpyridine rubber was vulcanized adjacent to initially unvulcanized or previously vulcanized Hevea—it made no difference. This condition is believed to explain in large part the poor adhesion of vinylpyridine rubbers to other rubbers, in ordinary practice.

It is believed possible that the success of the present invention may be due at least in part to the fact that the vinylpyridine rubber is not compounded for sulfur vulcanization in the first instance. However the mere use of dicumyl peroxide as the curative for the vinylpyridine rubber does not insure successful adhesion, as is amply demonstrated in the above examples. Instead, something more is needed, notably the presence of lead oxide. While it is not desired to limit this aspect of the invention to any particular theory of operation, it is believed possible that the lead oxide functions to scavenge the sulfur so that it does not interfere with the dicumyl peroxide cure.

*Example XII*

A. Example I is repeated, except that a ternary copolymer of 75% butadiene, 12.5% 2-methyl-5-vinylpyridine and 12.5% styrene is substituted for the vinylpyridine rubber there shown, with generally equivalent results.

B. Example I is repeated, except that rubbery polyisoprene (synthetic cis-polyisoprene) is substituted for natural rubber with generally equivalent results.

C. Example I is repeated, except that rubbery polybutadiene (cis-polybutadiene-1,3) is substituted for natural rubber with generally equivalent results.

*Example XIII*

In this example there were prepared some fifteen different base stocks, for the purpose of demonstrating the effectiveness of various forms of the invention, as well as for the purpose of demonstrating the inoperability of certain practices falling outside of the invention. Four of the stocks are based on SBR, and are identified by stock numbers SBR-1 to SBR-5. Seven of the stocks, identified as VPR-1 to VPR-7, are based on vinylpyridine copolymer rubber. Four more stocks, based on natural (Hevea) rubber, are identified as H-1 to H-4. Additional combinations were arrived at by blending two different base stocks together (in equal portions based on the rubber content) as indicated below. The following tables give the compositions of the fifteen base stocks:

|  | SBR-1 | SBR-2 | SBR-3 | SBR-4 |
|---|---|---|---|---|
| SBR | 100.00 | 100.00 | 100.00 | 100.00 |
| FEF black | 50.00 | 50.00 |  | 50.00 |
| Stearic acid | 1.50 | 1.50 | 1.50 | 1.50 |
| Zinc oxide | 5.00 | 5.00 | 5.00 | 5.00 |
| "Neozone D" | 1.00 | 1.00 | 1.00 | 1.00 |
| "#8 oil" | 8.00 | 8.00 | 8.00 | 8.00 |
| "Santocure" | 1.25 |  | 1.25 |  |
| Sulfur | 1.80 |  | 1.80 |  |
| Triethanolamine |  | 2.00 |  | 2.00 |
| Magnesium oxide |  | 10.00 |  | 10.00 |
| "DiCup 40C" |  | 3.75 |  | 3.75 |
| Triethanolamine treated HAF carbon black |  |  | 52.00 |  |
| Red lead |  |  |  | 7.0 |

|  | VPR 1 | VPR 2 | VPR 3 | VPR 4 | VPR 5 | VPR 6 | VPR 7 |
|---|---|---|---|---|---|---|---|
| Vinylpyridine rubber | 100.00 | 100.00 | 100.00 | 100.00 | 100.00 | 100.00 | 100.00 |
| HAF black | 40.00 |  | 40.00 | 40.00 | 40.00 | 40.00 | 40.00 |
| Triethanolamine Treated HAF carbon black |  | 42.00 |  |  |  | 42.00 |  |
| "BLE #25" | 1.00 | 1.00 | 1.00 | 1.00 | 1.00 | 1.00 | 1.00 |
| Triethanolamine | 2.00 |  | 2.00 | 2.00 | 2.00 |  | 2.00 |
| Magnesium oxide | 10.00 | 10.00 | 10.00 | 10.00 | 10.00 | 10.00 | 10.00 |
| Red lead | 7.00 | 7.00 |  |  | 7.00 |  | 7.00 |
| "Superla" wax | 5.00 | 5.00 | 5.00 | 5.00 | 5.00 | 5.00 | 5.00 |
| "Necton 60" | 5.00 | 5.00 | 5.00 | 5.00 | 5.00 | 5.00 | 5.00 |
| "DiCup 40C" | 3.75 | 3.75 | 3.75 |  |  | 3.75 |  |
| "SNS" |  |  |  | .35 | .35 |  | .35 |
| Sulfur |  |  |  | 1.75 | 1.75 |  | 1.75 |

|  | H-1 | H-2 | H-3 | H-4 |
|---|---|---|---|---|
| #2 smoked sheet | 100.00 | 100.00 | 100.00 | 100.00 |
| FEF black | 30.00 | 30.00 | 30.00 | 20.00 |
| Stearic acid | 2.00 | 2.00 | 2.00 | 2.00 |
| Zinc oxide | 5.00 | 5.00 | 5.00 | 10.00 |
| "BLE #25" | 1.00 | 1.00 | 1.00 | 1.00 |
| "Santocure" | .35 | .35 | .35 |  |
| Sulfur | 3.50 | 3.50 | 3.50 |  |
| Reclaimed rubber |  | 10.00 |  |  |
| Red lead |  |  | 7.00 |  |
| Pine tar |  |  |  | 2.00 |
| "Peptizer #1" |  |  |  | .08 |
| "UOP #288" |  |  |  | 3.50 |
| "DIBS" |  |  |  | .40 |
| Sulfur |  |  |  | 3.50 |

The triethanolamine treated carbon black referred to above was made by dissolving 2% triethanolamine in isopropyl alcohol, and adding 100 grams of this solution to 40 grams of carbon black, after which the isopropyl alcohol was allowed to evaporate from the resulting slurry at room temperature.

Laminates of various stocks were prepared, cured and tested for adhesion at 250° F. as in the previous examples. The results are shown in the table below which shows the stock used in each layer of some twenty-seven laminates, as well as the resulting adhesion, reported in pounds:

| Laminate No. | Stock of One Layer | Bonded to Stock of Other Layer | Adhesion |
|---|---|---|---|
| 1 | VPR-1 | SBR-1 | 15 |
| 2 | VPR-1 cement + VPR-1 layer. | SBR-1, precured and buffed. | 18 |
| 3 | VPR-1 | H-1 | 15 |
| 4 | VPR-1 | VPR-3 | 28 |
| 5 | VPR-1 | SBR-2 | 25 |
| 6 | VPR-1 | SBR-4 | 25 |
| 7 | VPR-1 | SBR-3 | 25-28 |
| 8 | VPR-1 | H-2 | 21.5 |
| 9 | VPR-1 | Blend of H-1 and VPR-3. | 30 |
| 10 | VPR-2 | SBR-3 | 28-30 |
| 11 | VPR-2 | SBR-1 | 21 |
| 12 | VPR-3 | SBR-1 | 10 |
| 13 | VPR-3 | Blend of VPR-1 and H-1. | 33 |
| 14 | VPR-4 | SBR-1 | 6.5 |
| 15 | VPR-4 | SBR-1 | 7.5 |
| 16 | VPR-4 | H-3 | 7.0 |
| 17 | VPR-4 | SBR-2 | 10 |
| 18 | VPR-4 | VPR-1 | 28 |
| 19 | VPR-4 | Blend of VPR-1 and H-1. | 30 |
| 20 | VPR-4 | SBR-4 | 12 |
| 21 | VPR-5 | H-3 | 7 |
| 22 | VPR-6 | SBR-3 | 9 |
| 23 | VPR-7 | SBR-1 | 34 |
| 24 | H-4 | SBR-2 | 5 |
| 25 | H-4 | Blend of SBR-2 and VPR-3. | 7 |
| 26 | H-4 | SBR-4 | 5 |
| 27 | SBR-1 | Blend of VPR-1 and SBR-4. | 33 |

Laminate No. 2 represents a typical re-treading practice, that is, the SBR-1 stock was first cured to represent a used tire carcass, and it was then buffed as if to prepare the carcass for re-treading. There was then applied to the buffed surface a cement made by dissolving stock VPR-1 in a solvent. Following this a sheet of solid VPR-1 stock, representing camelback or a new tread, was applied to the cemented surface and the whole assembly was cured under pressure, just as in re-treading practice. Old SBR or Hevea tires may be provided with new vinylpyridine rubber treads, which are firmly adherent, in this manner.

It will be noted that laminates Nos. 1 to 11 inclusive, 13, 18, 19, 23, 26 and 27 which represent various forms of the invention show good adhesion of at least 15 pounds and in some cases much higher. On the other hand, laminates Nos. 12, 14, 15, 16, 17, 20, 21, 22, 24, 25 and 26 which are outside of the invention, have poor adhesion values.

Laminates of the invention based on a blend were particularly unusual in their ability to retain strong adhesion even after aging. Thus, for example, laminate No. 19 still had an adhesive strength of 30 pounds after aging for 16 hours at 235° F., which is remarkable.

*Example XIV*

This example illustrates the adhesion of blends of vinylpyridine rubber with polyisoprene or polybutadiene, compounded for sulfur cure, to vinylpyridine rubber compounded for cure with dicumyl peroxide and containing lead oxide in accordance with the invention.

| | 1 | 2 | 3 |
|---|---|---|---|
| Cis polyisoprene | 50.00 | | |
| Cis-4-butadiene | | 50.00 | |
| Vinylpyridine rubber | 50.00 | 50.00 | 100.00 |
| FEF black | 15.00 | 15.00 | |
| HAF black | 20.00 | 20.00 | 40.00 |
| Stearic acid | 2.00 | 1.50 | |
| Zinc oxide | 2.50 | 2.50 | |
| "BLE #25" | 1.00 | 1.00 | 1.00 |
| "Santocure NS" | .18 | .63 | |
| Sulfur | 1.75 | .90 | |
| Triethanolamine | 1.00 | 1.00 | 2.00 |
| Magnesium oxide | 5.00 | 5.00 | 10.00 |
| Red lead | 3.50 | 3.50 | 7.00 |
| "Superla" wax | 2.50 | 2.50 | 5.00 |
| "Necton 60" | 2.50 | 2.50 | 5.00 |
| "DiCup 40C" | 1.75 | 1.75 | 3.75 |
| Adhesion to Stk. #3 at 250° F | 45-50 | 28-30 | |

Having thus described our invention, what we claim and desire to protect by Letters Patent is:

1. A method of adhering a rubbery vinylpyridine polymer selected from the group consisting of copolymers containing from 10 to 30% combined monovinylpyridine and from 90 to 70% combined butadiene, and terpolymers containing from 70 to 90% combined butadiene, the rest being made up of from 5 to 25% combined styrene and from 5 to 25% combined monovinylpyridine to another different rubber which is normally poorly adherent to said vinylpyridine rubber and which is a rubbery polymer of a conjugated diolefin selected from the group consisting of isoprene and butadiene, comprising compounding 100 parts of the said vinylpyridine rubber with from 0.25 to 8 parts of dicumyl peroxide and from 1 to 10 parts of lead oxide, the said parts and percentages being by weight, compounding the said other rubber for sulfur vulcanization, laminating the two differently compounded rubbers, and thereafter subjecting the laminate to vulcanizing conditions, whereby the vinylpyridine rubber becomes firmly bonded to the other rubber at the interface between the two rubbers.

2. A method as in claim 1 in which the said monovinylpyridine is a meta-monovinylpyridine, the said dicumyl peroxide is present in amount of from 0.8 to 4 parts, the said lead oxide is present in amount of from 5 to 7 parts, and the said other rubber is Hevea rubber.

3. A method as in claim 2, in which the said lead oxide is red lead.

4. A method as in claim 2, in which the said lead oxide is litharge.

5. A laminate comprising lamina (A) and lamina (B), lamina (A) comprising a compound of (1) 100 parts of a rubbery vinylpyridine polymer selected from the group consisting of copolymers containing from 10 to 30% combined monovinylpyridine and from 70 to 90% combined butadiene, and terpolymers containing from 70 to 90% combined butadiene, the rest being made up of from 5 to 25% combined styrene and from 5 to 25% combined monovinylpyridine, (2) from 0.25 to 8 parts of dicumyl peroxide and (3) from 1 to 10 parts of lead oxide, the said parts and percentages being by weight, and lamina (B) comprising another different rubber which is normally poorly adherent to said vinylpyridine rubber and which is a rubbery polymer of a conjugated diolefin selected from the group consisting of isoprene and butadiene compounded for sulfur vulcanization, lamina (A) being vulcanized to lamina (B).

6. A method of adhering a rubbery vinylpyridine polymer selected from the group consisting of copolymers containing from 10 to 30% combined monovinylpyridine and from 90 to 70% combined butadiene, and terpolymers containing from 70 to 90% combined butadiene, the rest being made up of from 5 to 25% combined styrene and from 5 to 25% combined monovinylpyridine to another different rubber which is normally poorly adherent to said vinylpyridine rubber and which is a rubbery polymer of a conjugated diolefin selected from the group consisting of isoprene and butadiene, comprising compounding 100 parts of the said vinylpyridine rubber with from 0.25 to 8 parts of dicumyl peroxide and from 1 to 10 parts of lead oxide, the said parts and percentages being by weight, compounding the said other rubber for sulfur vulcanization, mixing the two compounded rubbers together in weight ratio of from 5:95 to 95:5, laminating a layer of the resulting mixture to a layer comprising the said other rubber compounded for sulfur vulcanization, and thereafter subjecting the laminate to vulcanizing conditions.

7. A laminate comprising lamina (A) and lamina (B), lamina (A) comprising a blend of (a) a compound of (1) 100 parts of a rubbery vinylpyridine polymer selected from the group consisting of copolymers containing from 10 to 30% combined monovinylpyridine and from 70 to 90% combined butadiene, and terpolymers containing from 70 to 90% combined butadiene, the rest being made up of from 5 to 25% combined styrene and from 5 to 25% combined monovinylpyridine, (2) from 0.25 to 8 parts of dicumyl peroxide and (3) from 1 to 10 parts of lead oxide, the said parts and percentages being by weight, with (b) another different rubber which is a polymer of a conjugated diolefin selected from the group consisting of isoprene and butadiene compounded for sulfur vulcanization, said blend containing (a) and (b) in weight ratio of from 5:95 to 95:5, and lamina (B) comprising said other rubber compounded for sulfur vulcanization, lamina (A) being vulcanized to lamina (B).

8. A pneumatic tire having a tread comprising a rubbery vinylpyridine polymer selected from the group consisting of copolymers containing from 10 to 30% combined monovinylpyridine and from 90 to 70% combined butadiene, and terpolymers containing from 70 to 90% combined butadiene, the rest being made up of from 5 to 25% combined styrene and from 5 to 25% combined monovinylpyridine, and a carcass comprising another different rubber which is normally poorly adherent to said vinylpyridine rubber and which is a rubbery polymer of a conjugated diolefin selected from the group consisting of isoprene and butadiene, the said tread being firmly adhered to said carcass through an interposed layer of adhesion stock comprising a compound of 100 parts of said vinylpyridine rubber, from 0.25 to 8 parts of dicumyl peroxide and from 1 to 10 parts of lead oxide, the said parts and percentages being by weight.

References Cited in the file of this patent

UNITED STATES PATENTS

| | | |
|---|---|---|
| 2,234,621 | Brous | Mar. 11, 1941 |
| 2,467,322 | Lightbrown | Apr. 12, 1949 |
| 2,773,795 | Reynolds | Dec. 11, 1956 |
| 2,819,256 | Boardman | Jan. 7, 1958 |
| 2,981,304 | Barton et al. | Apr. 25, 1961 |
| 2,993,821 | Gunberg et al. | July 25, 1961 |
| 3,011,931 | Carpenter | Dec. 5, 1961 |
| 3,018,812 | Haxo et al. | Jan. 30, 1962 |